US012679183B2

(12) United States Patent (10) Patent No.: US 12,679,183 B2

Fukahori (45) Date of Patent: Jul. 14, 2026

(54) SLIDE DOOR SUPPORT MECHANISM

(71) Applicant: HONDA MOTOR CO., LTD., Tokyo (JP)

(72) Inventor: Takashi Fukahori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 390 days.

(21) Appl. No.: 18/391,715

(22) Filed: Dec. 21, 2023

(65) Prior Publication Data

US 2024/0227518 A1 Jul. 11, 2024

(30) Foreign Application Priority Data

Jan. 11, 2023 (JP) ................................. 2023-002142

(51) Int. Cl.
    *B60J 5/06* (2006.01)
    *E05D 15/10* (2006.01)
    *E05D 15/30* (2006.01)

(52) U.S. Cl.
    CPC ................ *B60J 5/06* (2013.01); *E05D 15/10* (2013.01); *E05D 15/30* (2013.01); *E05D 2015/1026* (2013.01); *E05D 2015/1031* (2013.01); *E05Y 2201/624* (2013.01); *E05Y 2201/688* (2013.01); *E05Y 2900/531* (2013.01)

(58) Field of Classification Search
    None
    See application file for complete search history.

(56) References Cited

U.S. PATENT DOCUMENTS

| | | | | |
|---|---|---|---|---|
| 8,152,221 | B2 * | 4/2012 | Yoshioka | E05D 15/1081 |
| | | | | 296/155 |
| 10,967,912 | B2 * | 4/2021 | Toyota | B62D 21/157 |
| 2013/0205671 | A1 * | 8/2013 | Ito | E05D 15/1081 |
| | | | | 49/420 |
| 2018/0119469 | A1 * | 5/2018 | Ishikawa | E05D 15/1081 |

FOREIGN PATENT DOCUMENTS

| | | | | |
|---|---|---|---|---|
| DE | 3532111 | A1 * | 3/1987 | B60J 7/0573 |
| JP | 3556571 | | 8/2004 | |

* cited by examiner

*Primary Examiner* — Joseph D. Pape

(74) *Attorney, Agent, or Firm* — Amin, Turocy & Watson, LLP

(57) ABSTRACT

A slide door support mechanism includes a lower rail provided on a vehicle body, a rear slide door configured to open and close a rear door opening portion of the vehicle body by slide movement, a door rail provided on the rear slide door, a first arm that bridges between the lower rail and the door rail, a vehicle body-side roller unit and a vehicle body-side roller provided on the first arm and slidably provided on the lower rail, a door-side roller provided on a first arm and slidably provided on the door rail, and a second arm pivotably supported by the rear slide door and the first arm.

5 Claims, 5 Drawing Sheets

FIG. 2

PASSENGER COMPARTMENT ←→ REARWARD (OPEN)

FORWARD (CLOSE) ←→ UPWARD

VEHICLE OUTER SIDE

PASSENGER COMPARTMENT

FORWARD (CLOSE) ← → REARWARD (OPEN)

UPWARD

VEHICLE OUTER SIDE

UPWARD

PASSENGER COMPARTMENT ◄──┼──► VEHICLE OUTER SIDE

FORWARD

DOWNWARD

SLIDE DOOR SUPPORT MECHANISM

CROSS-REFERENCE TO RELATED APPLICATION

Priority is claimed on Japanese Patent Application No. 2023-002142, filed Jan. 11, 2023, the content of which is incorporated herein by reference.

BACKGROUND OF THE INVENTION

Field of the Invention

The present invention relates to a slide door support mechanism.

Description of Related Art

In the related art, some vehicles are equipped with a slide door that opens and closes a door opening portion for boarding and alighting by sliding movement. A mechanism configured to support the slide door includes, for example, a rail provided on a vehicle body, an arm pivotably provided on the slide door, and a roller provided on the arm and slidably provided on the rail (see Japanese Patent No. 3556571).

The rail includes, for example, a main rail extending along the door opening portion in a forward/rearward direction, and a subsidiary rail disposed parallel to the main rail in a vehicle width direction.

The subsidiary rail is disposed parallel to the main rail and closer to a passenger compartment than the main rail until it reaches the vicinity of a closed position of the slide door from an open position of the slide door. In addition, the subsidiary rail is curved to gradually approach the main rail from the vicinity of the closed position toward the closed position of the slide door.

The roller includes a main guide roller slidably provided on the main rail, and a subsidiary guide roller slidably provided on the subsidiary rail.

Under this configuration, the main guide roller and the subsidiary guide roller are aligned in the vehicle width direction from the open position to the vicinity of the closed position of the slide door. For this reason, the arm is provided in a vehicle width direction. When the main guide roller and the subsidiary guide roller move to the closed position from the vicinity of the closed position of the slide door, the alignment direction of the main guide roller and the subsidiary guide roller gradually becomes along the forward/rearward direction. For this reason, the arm also gradually tilts and folds along the forward/rearward direction.

Since the slide door is pivotally provided on the arm, the arm is pulled toward the vehicle body as the arm is folded. In this way, the door opening portion can be closed by the slide door without pulling the rail toward the passenger compartment.

SUMMARY OF THE INVENTION

Incidentally, in the above-mentioned related art, the arm simply rotates about the pivoting axis relative to the slide door. For this reason, when the arm is folded, the arm protrudes greatly from the closed side end portion of the slide door. As a result, when another door (for example, a front door or the like) adjacent to the closed side end portion of the slide door is open, the folded arm protruding from the slide door may be exposed to deteriorate appearance design. In addition, easiness of boarding and alighting from the vehicle may be deteriorated.

For example, in order to shorten a protrusion length of the arm from the slide door, it is conceivable to shorten the length of the arm itself. However, with this configuration, when the slide door is opened, a distance between the vehicle body and the slide door becomes too short, which may cause interference. For this reason, the length of the arm cannot be shortened, and it is difficult to improve the appearance design.

An aspect of the present invention is directed to providing a slide door support mechanism capable of improving easiness of boarding and alighting from a vehicle while improving appearance design of the vehicle, and in turn, contributing to development of a sustainable transportation system.

An aspect of the present invention proposes the following configurations:

(1) A slide door support mechanism (for example, a slide door support mechanism (1) of an embodiment) according to the present invention includes a vehicle body-side guide (for example, a lower rail (105), a first rail (5), a second rail (6) of the embodiment) provided on a vehicle body (for example, a vehicle body (101) of the embodiment); a slide door (for example, a rear slide door (103*b*) of the embodiment) configured to open and close a door opening portion (for example, a rear door opening portion (102*b*) of the embodiment) of the vehicle body by slide movement; a door-side guide (for example, a door rail (2) of the embodiment) provided on the slide door; a first arm (for example, a first arm (3) of the embodiment) that bridges between the vehicle body-side guide and the door-side guide; a driven vehicle body-side guide (for example, a vehicle body-side roller unit (8), a vehicle body-side roller (14) of the embodiment) provided on the first arm and slidably provided on the vehicle body-side guide; a driven door-side guide (for example, a door-side roller (15) of the embodiment) provided on the first arm and slidably provided on the door-side guide; and a second arm (for example, a second arm (4) of the embodiment) pivotably supported by the slide door and the first arm.

With this configuration, when the door opening portion is closed by the slide door, the first arm is folded while sliding with respect to the door-side guide via the driven door-side guide. For this reason, even though the length of the first arm is long enough, the length of the first arm protruding from the slide door can be made as short as possible. Accordingly, easiness of boarding and alighting from the vehicle can be improved while appearance design of the vehicle can be improved. In turn, it can contribute to development of a sustainable transportation system.

In addition, behavior of the first arm can be restricted with a simple structure by providing the second arm. For this reason, an opening/closing operation of the slide door can be safely and reliably performed.

(2) In the above-mentioned configuration, a door-side support portion (for example, a door-side support portion (18) of the embodiment) that is provided on a closed side end portion of the slide door compared to the door-side guide in the slide door and that is configured to pivotably support the second arm may be provided.

With this configuration, the slide door can be reliably supported by the second arm. Incidentally, the driven door-side guide provided on the first arm and the door-side guide provided on the slide door have some rattling since the driven door-side guide can slide freely with respect to the door-side guide. The slide door can be closed accurately and stably relative to the door opening portion by supporting the second arm with less rattling on the closed side end portion of the slide door than in the door-side guide. In addition, there is no need to excessively eliminate rattling between the driven door-side guide and the door-side guide. For this reason, the driven door-side guide can be smoothly slid with respect to the door-side guide.

(3) In the above-mentioned configuration, an arm-side support portion (for example, a support shaft (17) of the embodiment) that is provided on a central portion of the first arm in a longitudinal direction and that is configured to pivotably support the second arm may be provided.

With this configuration, support strength of the first arm by the second arm can be increased. For example, the arm-side support portion being provided closer to the driven door-side guide portion (an end portion on the slide door side) than a center of the first arm in the longitudinal direction could be considered. Consequently, in this case, since this is the same as only both end portions of the first arm in the longitudinal direction being supported by the vehicle body-side or the door-side roller, it would be difficult to stabilize the first arm. For this reason, by configuring as above, the first arm can be stabilized by the second arm.

(4) In the above-mentioned configuration, the first arm may be curved to protrude inward in a vehicle width direction.

With this configuration, in a state in which the first arm is folded, the arm-side support portion provided on a central portion of the first arm in the longitudinal direction can be moved inward in the vehicle width direction. For this reason, in a state in which the first arm is folded, the driven vehicle body-side guide and the door-side support portion can be disposed to approach each other while connecting the second arm to the central portion of the first arm in the longitudinal direction. Accordingly, a width of the slide door support mechanism in the vehicle width direction can be made as small as possible.

(5) In the above-mentioned configuration, an inner surface (for example, an inner surface (107) of the embodiment) of the slide door in the vehicle width direction may include: a first surface (for example, a first arm attachment surface (107*b*) of the embodiment) on which the door-side guide is provided; and a second surface (for example, a second arm attachment surface (107*a*) of the embodiment) on which the second arm is supported and which is formed in a region in which the second arm overlaps in the vehicle width direction, and the second surface may be located outside the first surface in the vehicle width direction.

In a state in which the first arm is folded, the first arm and the second arm overlap each other in the vehicle width direction. That is, in the slide door support mechanism, in a state in which the first arm is folded, the width in the vehicle width direction is greater at the place where the second arm is present than at the place where the second arm is not present. Here, by locating the second surface further outward in the vehicle width direction than the first surface, the gap between the vehicle body and the slide door when the slide door is closed can be reduced. The slide door support mechanism can be disposed in the gap.

According to an aspect of the present invention, it is possible to provide a slide door support mechanism capable of improving easiness of boarding and alighting from a vehicle while improving appearance design of the vehicle, and in turn, contributing to development of a sustainable transportation system.

BRIEF DESCRIPTION OF THE DRAWINGS

FIG. 2 is a schematic configuration view of a slide door support mechanism seen from above on the way to an open position of a rear slide door according to the embodiment of the present invention.

DETAILED DESCRIPTION OF THE INVENTION

Next, an embodiment of the present invention will be described on the basis of the accompanying drawings.

<Vehicle>

Figure 1:
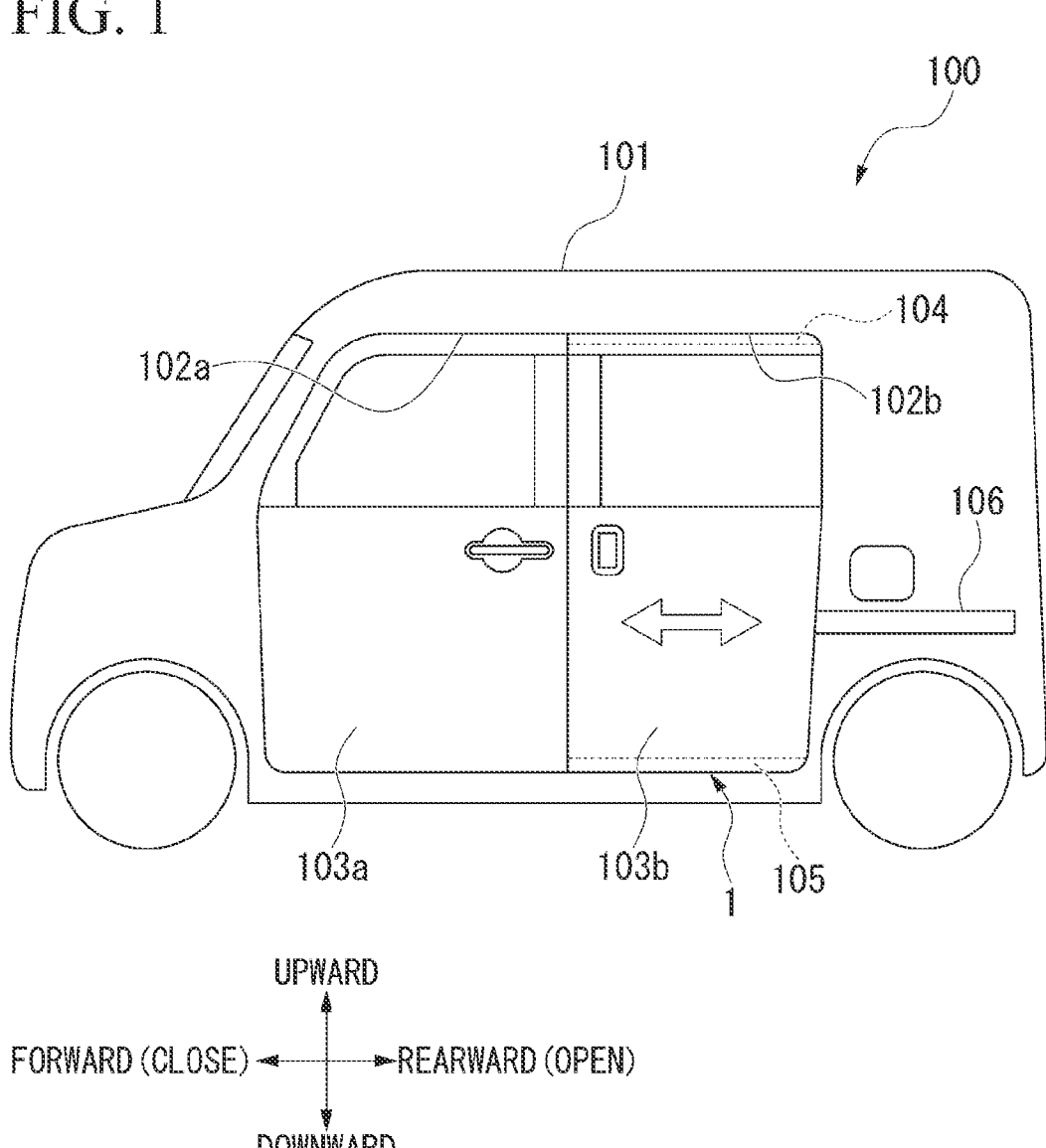
FIG. 1 is a schematic side view of a vehicle according to an embodiment of the present invention.

FIG. 1 is a schematic side view of a vehicle 100 in which a slide door support mechanism 1 according to the present invention is provided.

In the following description, a ground side of the vehicle 100 is simply referred to as a lower side, a ceiling side of the vehicle 100 is simply referred to as an upper side, and the front of the vehicle 100 in a direction of advance is simply referred to as a front side, and the rear in the direction of advance is simply referred to as a rear side, an inner side in a vehicle width direction is referred to as a passenger compartment side, and an outer side in the vehicle width direction is referred to as a vehicle outer side.

As shown in FIG. 1, a side portion of a vehicle body 101 of the vehicle 100 has, for example, a front door opening portion 102*a*, and a rear door opening portion 102*b* (door opening portion) formed behind the front door opening portion 102*a*. The front door opening portion 102*a* is opened and closed by a front door 103*a* provided on the vehicle body 101 via a hinge mechanism (not shown). The rear door opening portion 102*b* is opened and closed by a rear slide door 103*b* (slide door).

The side portion of the vehicle body 101 has an upper rail 104 disposed on an upper side of the rear door opening portion 102*b*, a lower rail 105 (vehicle body-side guide) disposed on a lower side of the rear door opening portion 102*b*, and a center rail 106 disposed on a rear side of a central portion of the rear door opening portion 102*b* in an upward/downward direction. The rear slide door 103*b* is slidably provided on these rails 104, 105 and 106.

When the rear slide door 103*b* is located at the rearmost side, the rear door opening portion 102*b* is fully open. Hereinafter, this position is referred to as an open position of the rear slide door 103*b*. When the rear slide door 103*b* is located at the foremost side, the rear door opening portion 102*b* is fully closed. Hereinafter, this position is referred to as a closed position of the rear slide door 103*b*. Among the rails 104, 105 and 106, for example, the lower rail 105 constitutes the slide door support mechanism 1.

Slide Door Support Mechanism

Figure 2:
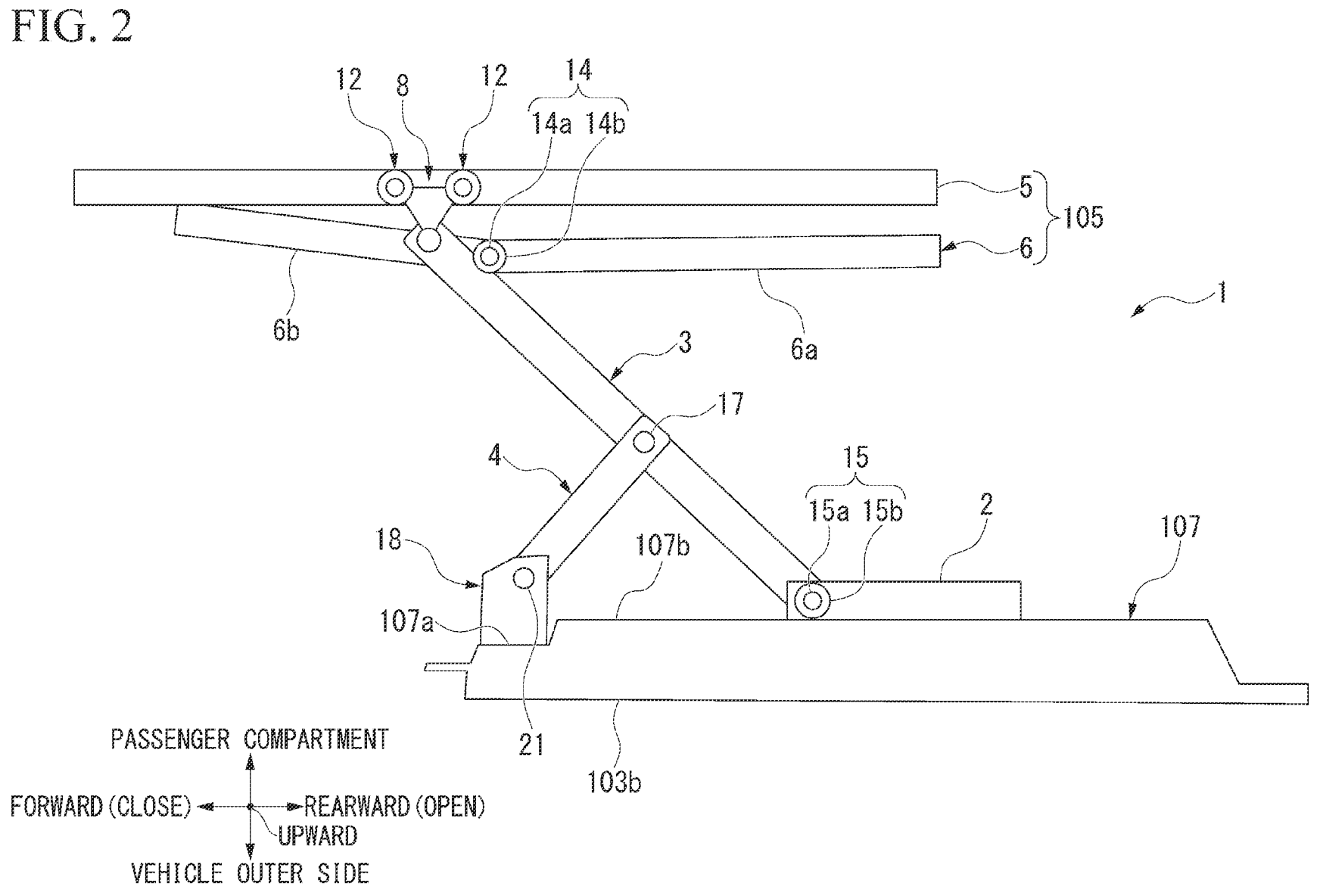
Figure 3:
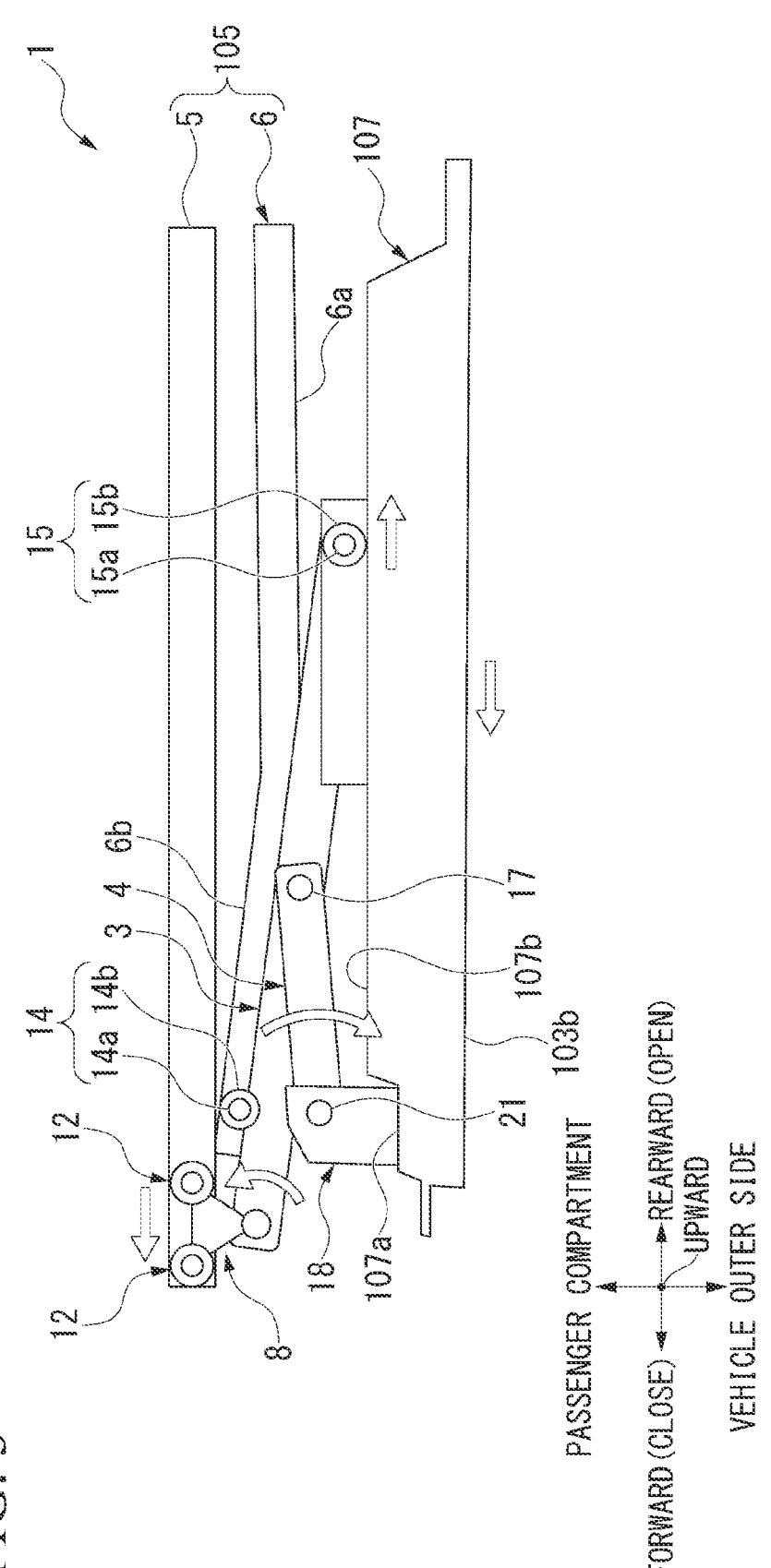
FIG. 3 is a schematic configuration view of the slide door support mechanism at a closed position of the rear slide door according to embodiment of the present invention seen from above.

FIG. 2 and FIG. 3 are schematic configuration views of the slide door support mechanism 1 seen from above. FIG.

Figure 4:
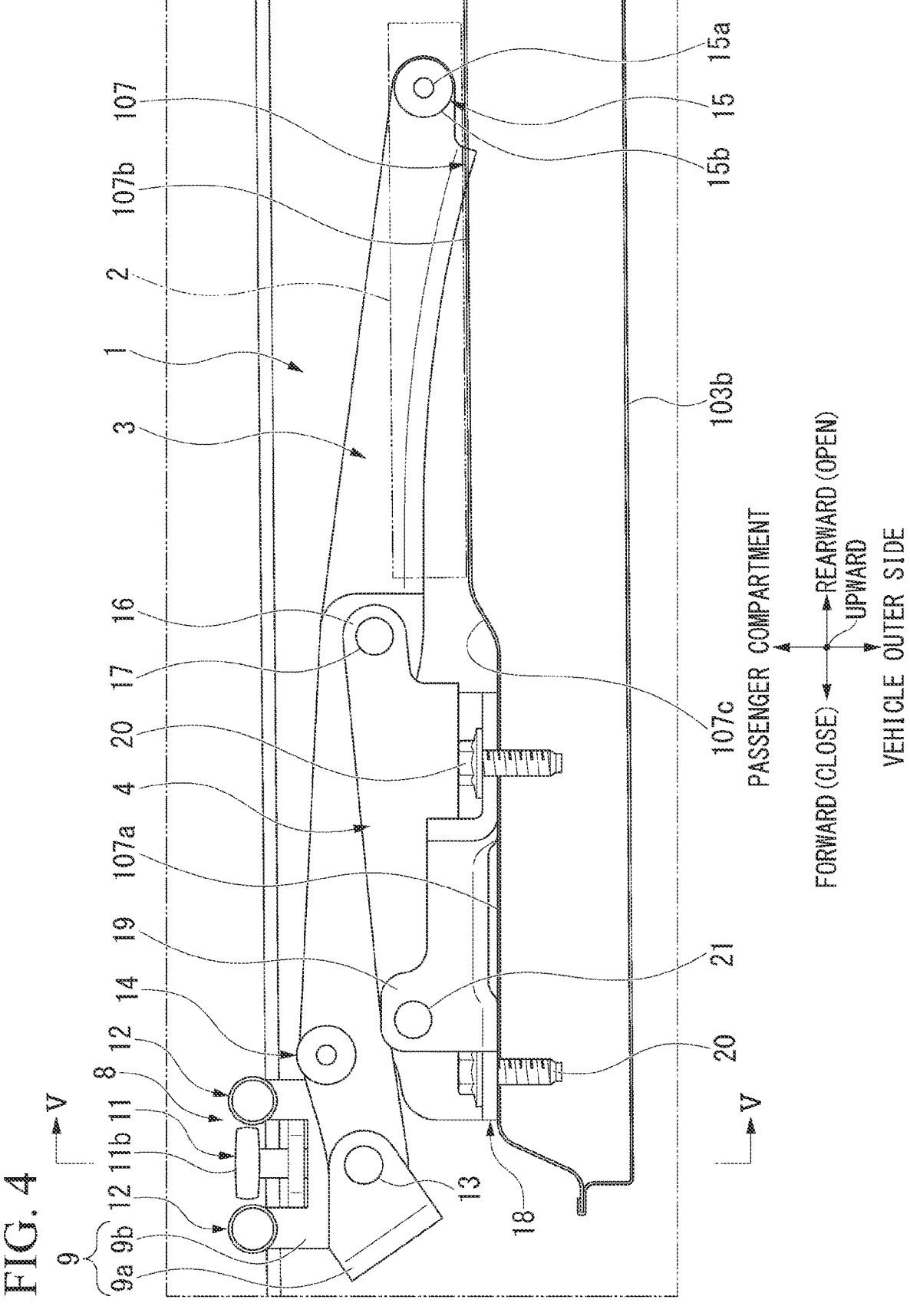
FIG. 4 is a plan view of the slide door support mechanism seen from above in the state of FIG. 3, a part of which is cut away.
Figure 5:
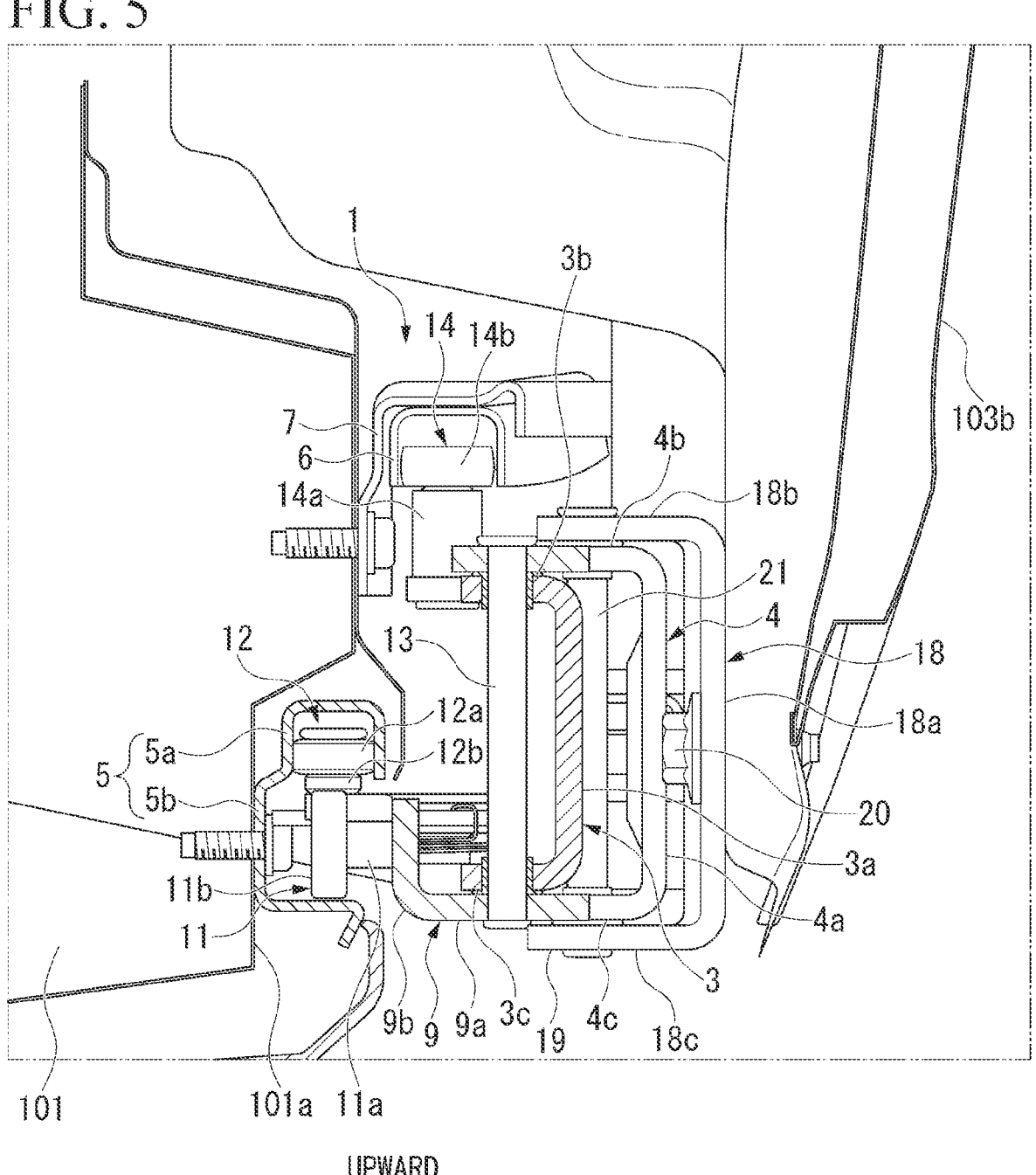
FIG. 5 is a cross-sectional view along line V-V of FIG. 4.

2 is a view of the rear slide door 103b in an open state in the middle of the open position. FIG. 3 shows a closed position of the rear slide door 103b. FIG. 4 is a plan view of the slide door support mechanism 1 in a state of FIG. 3 from above, a part of which is cut away. FIG. 5 is a cross-sectional view along line V-V in FIG. 4.

As shown in FIG. 2 to FIG. 5, the slide door support mechanism 1 includes the lower rail 105, a door rail 2 (door-side guide) provided on an inner surface 107 of the passenger compartment side of the rear slide door 103b, a first arm 3 that bridges between the lower rail 105 and the door rail 2, and a second arm 4 rotatably supported by the rear slide door 103b and the first arm 3, as major components.

The lower rail 105 includes a first rail 5 (vehicle body-side guide) disposed on a lower end of the rear door opening portion 102b, and a second rail 6 (vehicle body-side guide) disposed on a vehicle outer side of the first rail 5 and above the first rail 5.

As shown in FIG. 5 in detail, the first rail 5 is fixed to a rail receiving concave portion 101a formed in the vehicle body 101. The first rail 5 extends in a forward/rearward direction. A cross-sectional shape of the first rail 5 in the vehicle width direction and the upward/downward direction has a C shape, a vehicle outer side of which is open. The first rail 5 has a lateral roller receiving portion 5a and a longitudinal roller receiving portion 5b, which are formed integrally with each other.

The vehicle outer side of the lateral roller receiving portion 5a is open. A lateral roller 11, which will be described below, is slidably received in the lateral roller receiving portion 5a. The longitudinal roller receiving portion 5b is disposed on an upper portion of the lateral roller receiving portion 5a. The longitudinal roller receiving portion 5b and the lateral roller receiving portion 5a are in communication with each other in the upward/downward direction. That is, a cross-sectional shape of the longitudinal roller receiving portion 5b in the vehicle width direction and the upward/downward direction is a C shape, a lower side of which is open. A longitudinal roller 12, which will be described, is slidably received in the longitudinal roller receiving portion 5b.

The second rail 6 is fixed to a portion of the vehicle body 101 above the rail receiving concave portion 101a via a bracket 7. Accordingly, the second rail 6 is disposed on a vehicle outer side of the first rail 5 and above the first rail 5. A cross-sectional shape of the second rail 6 in the vehicle width direction and the upward/downward direction is a C shape, a lower side of which is open.

As shown in FIG. 2 in detail, the second rail 6 includes a second rail main body 6a formed in a large portion, and a curved rail portion 6b formed in a front portion that is a closed side end portion of the second rail main body 6a. The second rail main body 6a is formed from the open position of the rear slide door 103b to the vicinity of the closed position of the rear slide door 103b. The second rail main body 6a extends parallel to the first rail 5.

The curved rail portion 6b is formed to approach the passenger compartment side and curved in the vehicle width direction from the closed side end portion of the second rail main body 6a toward the closed position. In other words, the curved rail portion 6b is formed to be curved in the vehicle width direction to gradually approach the first rail 5 when seen in the upward/downward direction from the closed side end portion of the second rail main body 6a toward the closed position. The curved rail portion 6b is continuous with the second rail main body 6a. A vehicle body-side roller 14, which will be described below, is slidably received in the second rail 6.

As shown in FIG. 4 in detail, the inner surface 107 of the rear slide door 103b includes a second arm attachment surface 107a (second surface) formed on the front side that is the closed side end portion, and a first arm attachment surface 107b (first surface) formed in a large portion of the inner surface 107 of the rear slide door 103b behind the second arm attachment surface 107a. The second arm attachment surface 107a and the first arm attachment surface 107b are flat surfaces in the forward/rearward direction and the upward/downward direction, respectively. The second arm attachment surface 107a is located on the vehicle outer side of the first arm attachment surface 107b. The second arm attachment surface 107a and the first arm attachment surface 107b are continuous with each other via a stepped portion 107c. The door rail 2 is provided on the first arm attachment surface 107b.

The door rail 2 extends along the first arm attachment surface 107b in the forward/rearward direction. A cross-sectional shape of the door rail 2 in the vehicle width direction and the upward/downward direction is a C shape, a lower side of which is open. A door-side roller 15 (driven door-side guide), which will be described below, is slidably received in the door rail 2.

As shown in FIG. 4 in detail, the first arm 3 is slightly curved to protrude toward the passenger compartment side.

As shown in FIG. 5 in detail, a cross-sectional shape of the first arm 3 in the vehicle width direction and the upward/downward direction is a C shape, a passenger compartment side of which is open. That is, the first arm 3 has a first longitudinal wall 3a in the upward/downward direction, a first upper lateral wall 3b protruding from an upper end of the first longitudinal wall 3a toward the passenger compartment side, and a first lower lateral wall 3c protruding from a lower end of the first longitudinal wall 3a toward the passenger compartment side, which are integrally formed.

A vehicle body-side roller unit 8 (driven vehicle body-side guide) is provided on an end portion of the first arm 3 on the side of the lower rail 105. The vehicle body-side roller unit 8 includes a bracket 9 attached to the first upper lateral wall 3b and the first lower lateral wall 3c, and the lateral roller 11 and the longitudinal roller 12 supported by the bracket 9.

The bracket 9 includes a fixed portion 9a attached to the first arm 3, and a base portion 9b formed integrally with the fixed portion 9a. The fixed portion 9a is formed in a C shape to overlap the upper portion of the first upper lateral wall 3b and the lower portion of the first lower lateral wall 3c. The fixed portion 9a is rotatably supported by the first arm 3 via a support shaft 13. The support shaft 13 passes through the first upper lateral wall 3b and the first lower lateral wall 3c and extends in the upward/downward direction.

The base portion 9b extends from the lower wall of the fixed portion 9a toward the lower rail 105. The lateral roller 11 and the longitudinal roller 12 are supported by an end portion of the base portion 9b on the side of the lower rail 105.

The lateral roller 11 includes a spindle 11a protruding from the base portion 9b toward the passenger compartment side in the vehicle width direction, and a lateral roller main body 11b rotatably supported by an end portion of the spindle 11a on the passenger compartment side. The lateral roller main body 11b is received in the lateral roller receiving portion 5a of the first rail 5.

Two longitudinal rollers 12 are provided. The two longitudinal rollers 12 are disposed on both sides in the forward/rearward direction with the lateral roller 11 sandwiched therebetween. The longitudinal roller 12 includes a spindle 12*a* protruding upward from the base portion 9*b*, and a longitudinal roller main body 12*b* rotatably supported by an upper end of the spindle 12*a*. The spindle 12*a* and the longitudinal roller main body 12*b* are aligned with the lateral roller main body 11*b* in the upward/downward direction. The longitudinal roller main body 12*b* is received in the longitudinal roller receiving portion 5*b*. Since the roller main bodies 11*b* and 12*b* are rotated in the roller receiving portions 5*a* and 5*b*, respectively, the vehicle body-side roller unit 8 is slidably provided on the first rail 5.

The vehicle body-side roller 14 (driven vehicle body-side guide) is provided on a side of the first arm 3 closer to the door rail 2 than the vehicle body-side roller unit 8. The vehicle body-side roller 14 is disposed on the first upper lateral wall 3*b* of the first arm 3. The vehicle body-side roller 14 includes a spindle 14*a* protruding upward from the first upper lateral wall 3*b*, and a vehicle body-side roller main body 14*b* rotatably supported by the upper end of the spindle 14*a*.

A place of the first upper lateral wall 3*b* corresponding to the vehicle body-side roller 14 slightly overhangs toward a side opposite to the first longitudinal wall 3*a*. The vehicle body-side roller main body 14*b* is received in the second rail 6. Since the vehicle body-side roller main body 14*b* is rotated in the second rail 6, the vehicle body-side roller 14 is slidably provided on the second rail 6.

The door-side roller 15 is provided on an end portion of the first arm 3 on the side of the door rail 2. The door-side roller 15 is disposed on the first upper lateral wall 3*b* of the first arm 3. The door-side roller 15 includes a spindle 15*a* protruding upward from the first upper lateral wall 3*b*, and a door-side roller main body 15*b* rotatably supported on the upper end of the spindle 15*a*. The door-side roller main body 15*b* is received in the door rail 2. Since the door-side roller main body 15*b* is rotated in the door rail 2, the door-side roller 15 is slidably provided on the door rail 2.

As shown in FIG. 5 in detail, a cross-sectional shape of the second arm 4 in the vehicle width direction and the upward/downward direction is a C shape, a passenger compartment side of which is open. That is, the second arm 4 has a second longitudinal wall 4*a* in the upward/downward direction, a second upper lateral wall 4*b* protruding from an upper end of the second longitudinal wall 4*a* toward the passenger compartment side, and a second lower lateral wall 4*c* protruding from a lower end of the second longitudinal wall 4*a* toward the passenger compartment side, which are formed integrally with each other.

A width between an inner surface of the second upper lateral wall 4*b* and an inner surface of the second lower lateral wall 4*c* is slightly greater than a width between an outer surface of the first upper lateral wall 3*b* and an outer surface of the first lower lateral wall 3*c*. Tongue portions 16 are formed to extend from the end portions of the second upper lateral wall 4*b* and the second lower lateral wall 4*c* on the side of the first arm 3, respectively. Each of the tongue portions 16 extends in a longitudinal direction of the second arm 4. Each of the tongue portions 16 overlaps the outer surface of the first upper lateral wall 3*b* and overlaps the outer surface of the first lower lateral wall 3*c*. Each of the tongue portions 16 is rotatably supported by the first arm 3 via a support shaft 17 (arm-side support portion).

The support shaft 17 is provided on a central portion of the first arm 3 in a longitudinal direction. The central portion in the longitudinal direction does not mean only the complete center in the longitudinal direction of the first arm 3, but also includes the surrounding neighborhood including the center. The support shaft 13 passes through the first upper lateral wall 3*b* and the first lower lateral wall 3*c* and extends in the upward/downward direction.

An end portion of the second arm 4 on the side of the rear slide door 103*b* is rotatably supported by the rear slide door 103*b* via a door-side support portion 18. As shown in FIG. 5 in detail, a cross-sectional shape of the door-side support portion 18 in the vehicle width direction and the upward/downward direction is a C shape, a passenger compartment side of which is open. That is, the door-side support portion 18 has a support portion longitudinal wall 18*a* extending in the upward/downward direction, a support portion upper lateral wall 18*b* protruding from the upper end of the support portion longitudinal wall 18*a* toward the passenger compartment side, and a support portion lower lateral wall 18*c* protruding from the lower end of the support portion longitudinal wall 18*a* toward the passenger compartment side, which are formed integrally.

The support portion longitudinal wall 18*a* is formed long in the forward/rearward direction. A length of the support portion longitudinal wall 18*a* in the forward/rearward direction is substantially equal to a length of the second arm 4 in the longitudinal direction except the tongue portions 16. The support portion longitudinal wall 18*a* is placed on the second arm attachment surface 107*a* of the rear slide door 103*b*. A length of the second arm attachment surface 107*a* in the forward/rearward direction is slightly greater than a length of the support portion longitudinal wall 18*a* in the forward/rearward direction. The support portion longitudinal wall 18*a* is fastened and fixed to the second arm attachment surface 107*a* via a bolt 20.

A width between an inner surface of the support portion upper lateral wall 18*b* and an inner surface of the support portion lower lateral wall 18*c* is slightly greater than a width between an outer surface of the second upper lateral wall 4*b* and an outer surface of the second lower lateral wall 4*c*.

Tongue portions 19 are formed to extend from closed side end portions of the support portion upper lateral wall 18*b* and the support portion lower lateral wall 18*c* toward the passenger compartment side, respectively. Each of the tongue portions 19 overlaps the outer surface of the second upper lateral wall 4*b* and overlaps the outer surface of the second lower lateral wall 4*c*. The second arm 4 is rotatably supported by each of the tongue portions 19 via a support shaft 21. The support shaft 21 passes through the second upper lateral wall 4*b* and the second lower lateral wall 4*c* and extends in the upward/downward direction.

Here, a length of the support portion longitudinal wall 18*a* in the forward/rearward direction is substantially equal to a length of the second arm 4 in the longitudinal direction except the tongue portions 16, and a length of the second arm attachment surface 107*a* in the forward/rearward direction is slightly greater than a length of the support portion longitudinal wall 18*a* in the forward/rearward direction. Accordingly, the second arm attachment surface 107*a* is formed in a pivoting region of the second arm 4, i.e., a region overlapping the second arm 4 in the vehicle width direction.

<Operation of Slide Door Support Mechanism>

Next, an operation of the slide door support mechanism 1 will be described on the basis of FIG. 2 to FIG. 5. As shown in FIG. 2, when the rear slide door 103*b* is located at the open position, the vehicle body-side roller 14 is located at the second rail main body 6*a* of the second rail 6. For this reason, the vehicle body-side roller unit 8 and the vehicle body-side roller 14 are disposed at a fixed interval in the vehicle width direction. For this reason, an angle between the first arm 3 and the vehicle body 101 and an angle between the first arm 3 and the rear slide door 103*b* are large, and the first arm 3 is in an upright state.

In a state in which the first arm 3 stands upright, an angle between the first arm 3 and the second arm 4 and an angle between the second arm 4 and the rear slide door 103*b* are also large, and the second arm 4 stands also upright following the first arm 3. In addition, in a state in which the first arm 3 stands upright, the door-side roller 15 is located near the closed position (toward the front) of the door rail 2.

When the rear slide door 103*b* is moved to the closed position from this state, as shown in FIG. 3, the vehicle body-side roller 14 is slid to the curved rail portion 6*b*. Since the first rail 5 and the curved rail portion 6*b* gradually approach each other in the vehicle width direction as they move toward the closed position, the vehicle body-side roller 14 is shifted rearward relative to the vehicle body-side roller unit 8.

Accordingly, an angle between the first arm 3 and the vehicle body 101 and an angle between the first arm 3 and the rear slide door 103*b* are gradually reduced, and the first arm 3 is gradually folded. An angle between the first arm 3 and the second arm 4 and an angle between the second arm 4 and the rear slide door 103*b* are also reduced, and the second arm 4 is also folded following the first arm 3.

Here, an end portion of the second arm 4 on the side of the first arm 3 is rotatably supported by the first arm 3 via the support shaft 17. An end portion of the second arm 4 on the side of the rear slide door 103*b* is rotatably supported by the rear slide door 103*b* via the door-side support portion 18. For this reason, the second arm 4 is folded by pushing the first arm 3 rearward. As a result, the first arm 3 is folded while moving the door-side roller 15 to slide along the door rail 2 in an open position direction (rearward). Then, the rear slide door 103*b* is pulled toward the passenger compartment side, and the rear slide door 103*b* is located at the closed position.

In addition, as shown in FIG. 5 in detail, since a width between an inner surface of the second upper lateral wall 4*b* and an inner surface of the second lower lateral wall 4*c* is slightly greater than a width between an outer surface of the first upper lateral wall 3*b* and an outer surface of the first lower lateral wall 3*c*, when the first arm 3 and the second arm 4 are folded, a part of the first arm 3 is received in the second arm 4. Since a width between an inner surface of the support portion upper lateral wall 18*b* and an inner surface of the support portion lower lateral wall 18*c* is slightly greater than a width between an outer surface of the second upper lateral wall 4*b* and an outer surface of the second lower lateral wall 4*c*, when the second arm 4 is folded in the door-side support portion 18, the second arm 4 is received in the door-side support portion 18. For this reason, when the first arm 3 or the second arm 4 is folded, the first arm 3 or the second arm 4 is not bulky.

In this way, the slide door support mechanism 1 includes the lower rail 105 provided on the vehicle body 101, the door rail 2 provided on the rear slide door 103*b*, the first arm 3 that bridges between the lower rail 105 and the door rail 2, the vehicle body-side roller unit 8, the vehicle body-side roller 14 and the door-side roller 15 provided on the first arm 3, and the second arm 4 pivotally supported by the rear slide door 103*b* and the first arm 3.

For this reason, when the rear door opening portion 102*b* is closed by the rear slide door 103*b*, the first arm 3 can be folded while slidably moving with respect to the door rail 2 via the door-side roller 15. Accordingly, when the rear slide door 103*b* is closed even though a length of the first arm 3 is sufficiently large, the length of the first arm 3 protruding from the rear slide door 103*b* can be made as short as possible. Accordingly, easiness of boarding and alighting from the vehicle 100 can be improved while appearance design of the vehicle 100 can be improved. In turn, it is possible to contribute to the development of a sustainable transportation system.

In addition, it is possible to restrict a behavior of the first arm 3 with a simple structure by providing the second arm 4. For this reason, an opening/closing operation of the rear slide door 103*b* can be safely and reliably performed.

The door-side support portion 18 is provided on the end portion of the inner surface 107 of the rear slide door 103*b* closer to the closed side than the door rail 2. The second arm 4 is pivotally supported by the rear slide door 103*b* via the door-side support portion 18. For this reason, the rear slide door 103*b* can be reliably supported by the second arm 4.

Incidentally, the door-side roller 15 provided on the first arm 3 and the door rail 2 provided on the rear slide door 103*b* have some rattling since the door-side roller 15 can slide freely with respect to the door rail 2. The rear slide door 103*b* can be closed accurately and stably with respect to the rear door opening portion 102*b* by supporting the second arm 4 with less rattling on the closed side end portion of the rear slide door 103*b* than on the door rail 2. In addition, there is no need to excessively eliminate the rattling between the door rail 2 and the door-side roller 15. Accordingly, the door-side roller 15 can be smoothly slid with respect to door rail 2.

The support shaft 17 configured to pivotally support the second arm 4 is provided on a central portion of the first arm 3 in a longitudinal direction. For this reason, support strength of the first arm 3 due to the second arm 4 can be increased. For example, it is assumed that the support shaft 17 is provided closer to the door-side roller 15 (an end portion on the side of the rear slide door 103*b*) than a center of the first arm 3 in the longitudinal direction. In this case, eventually, this is the same as only both end portions of the first arm 3 in the longitudinal direction being supported by the vehicle body-side roller unit 8 and the vehicle body-side roller 14 or the door-side roller 15. This configuration makes it difficult to stabilize the first arm 3. Accordingly, by configuring as above, the first arm 3 can be stabilized by the second arm 4.

The first arm 3 is slightly curved to protrude toward the passenger compartment side. For this reason, in a state in which the first arm 3 is folded, the support shaft 17 provided on the central portion of the first arm 3 in the longitudinal direction can be moved inward in the vehicle width direction. Accordingly, in a state in which the first arm 3 is folded, the vehicle body-side roller unit 8, the vehicle body-side roller 14 and the support shaft 17 can be disposed close to each other in the vehicle width direction while connecting the second arm 4 to the central portion of the first arm 3 in the longitudinal direction. Accordingly, the width of the slide door support mechanism 1 in the vehicle width direction can be made as small as possible.

The inner surface 107 of the rear slide door 103*b* includes a first arm attachment surface 107*b* on which the door rail 2 is provided, and a second arm attachment surface 107*a*, on which the second arm 4 is supported, formed in a region in which the second arm 4 overlaps in the vehicle width direction.

Here, in a state in which the rear slide door 103*b* is located at the closed position, the door-side support portion 18, the second arm 4 and the first arm 3 are folded on the second arm attachment surface 107*a* of the rear slide door 103*b*. For this reason, in the slide door support mechanism 1, the width in the vehicle width direction is greater at the place where the second arm 4 is present than at the place where the second arm 4 is not present.

In other words, at the place corresponding to the second arm attachment surface 107*a*, the width of the slide door support mechanism 1 in the vehicle width direction becomes great. However, the second arm attachment surface 107*a* is located on a vehicle outer side of the first arm attachment surface 107*b*. For this reason, in a state in which the rear slide door 103*b* is located at the closed position, a width between the vehicle body 101 and the first arm attachment surface 107*b* of the rear slide door 103*b* does not become large. That is, a gap between the vehicle body 101 and the rear slide door 103*b* when the rear slide door 103*b* is closed can be reduced. The slide door support mechanism 1 can be disposed in the gap.

The present invention is not limited to the above-mentioned embodiment, and various changes may be added to the above-mentioned embodiment without departing from the scope of the present invention.

For example, in the above-mentioned embodiment, the case in which the lower rail 105 constitutes the slide door support mechanism 1 has been described. However, it is not limited thereto, and the upper rail 104 may constitute the slide door support mechanism 1.

In the above-mentioned embodiment, the case in which the lower rail 105 is constituted by the two rails of the first rail 5 and the second rail 6 has been described. However, it is not limited thereto but may be one rail. In the case of one rail, a separate structure for folding the first arm 3 may be provided. In the case of one rail, depending on the rail, either the vehicle body-side roller unit 8 or the vehicle body-side roller 14 may be provided, or a mechanism may be provided in place of these.

In the above-mentioned embodiment, the case in which the lower rail 105, the vehicle body-side roller unit 8 and the vehicle body-side roller 14 are provided in order to provide the first arm 3 to be slidably movable with respect to the vehicle body 101 has been described. The case in which the door rail 2 and the door-side roller 15 are provided in order to provide the first arm 3 to be slidably movable with respect to the rear slide door 103*b* has been described.

However, it is not limited thereto. The vehicle body-side guide may be provided on the vehicle body 101 instead of the lower rail 105, and the driven vehicle body-side guide slidably supported by the vehicle body-side guide may be provided on the first arm 3 instead of the vehicle body-side roller unit 8 and the vehicle body-side roller 14. The door-side guide may be provided on the rear slide door 103*b* instead of the door rail 2, and the driven door-side guide slidably supported by the door-side guide may be provided on the first arm 3 instead of the door-side roller 15. The vehicle body-side guide, the driven vehicle body-side guide, the door-side guide, and the driven door-side guide can also be provided by, for example, changing each of the rollers 11, 12, 14 and 15 to a shoe, or changing each of the rails 2 and 105 to a bar. The vehicle body-side guide, the driven vehicle body-side guide, the door-side guide, and the driven door-side guide can also be constituted by a known so-called slide mechanism or trapezoidal screw.

In the above-mentioned embodiment, the case in which the rear slide door 103*b* is located at the closed position with respect to the rear door opening portion 102*b* by slidably moving the rear slide door 103*b* forward has been described. However, it is not limited thereto, and the rear slide door 103*b* may be located at the closed position with respect to the rear door opening portion 102*b* by slidably moving the rear slide door 103*b* rearward. In this configuration, the closed side end portion is referred to as a rear portion.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A slide door support mechanism comprising:
   a vehicle body-side guide provided on a vehicle body;
   a slide door configured to open and close a door opening portion of the vehicle body by slide movement;
   a door-side guide provided on the slide door;
   a first arm that bridges between the vehicle body-side guide and the door-side guide;
   a driven vehicle body-side guide provided on the first arm and slidably provided on the vehicle body-side guide;
   a driven door-side guide provided on the first arm and slidably provided on the door-side guide; and
   a second arm pivotably supported by the slide door and the first arm.

2. The slide door support mechanism according to claim 1, comprising a door-side support portion that is provided on a closed side end portion of the slide door compared to the door-side guide in the slide door and that is configured to pivotably support the second arm.

3. The slide door support mechanism according to claim 2, comprising an arm-side support portion that is provided on a central portion of the first arm in a longitudinal direction and that is configured to pivotably support the second arm.

4. The slide door support mechanism according to claim 3, wherein the first arm is curved to protrude inward in a vehicle width direction.

5. The slide door support mechanism according to claim 1, wherein an inner surface of the slide door in the vehicle width direction comprises:
   a first surface on which the door-side guide is provided; and
   a second surface on which the second arm is supported and which is formed in a region in which the second arm overlaps in the vehicle width direction, and
   the second surface is located outside the first surface in the vehicle width direction.

\* \* \* \* \*